Oct. 11, 1966  D. E. WOLFORD  3,278,124
APPARATUS FOR SPRAYING
Filed July 20, 1964
3 Sheets-Sheet 1
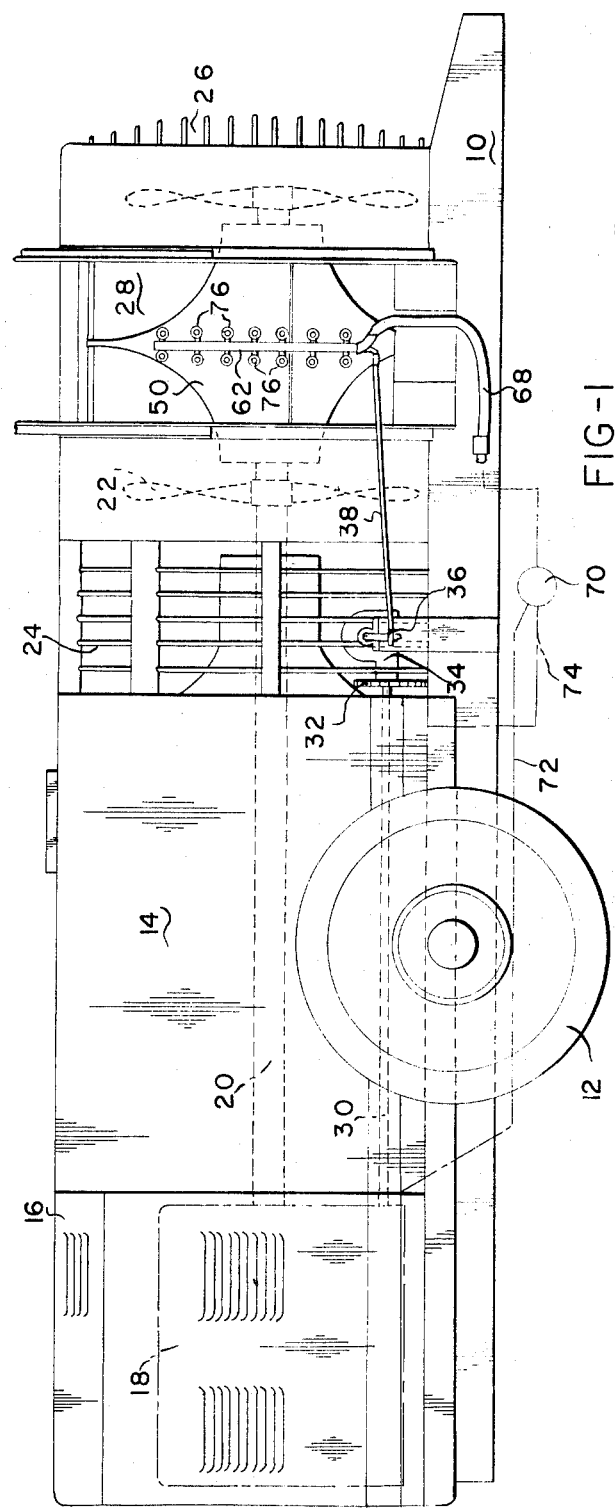
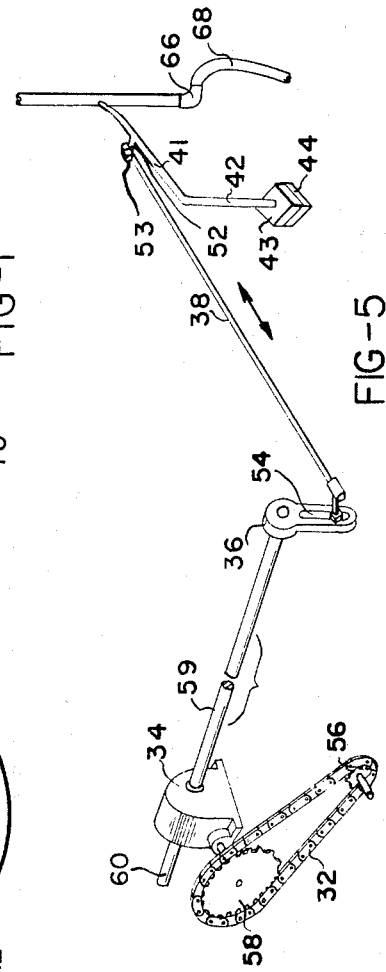
INVENTOR.
DALE E. WOLFORD
BY
Toulmin & Toulmin
ATTORNEYS Oct. 11, 1966  D. E. WOLFORD  3,278,124
APPARATUS FOR SPRAYING
Filed July 20, 1964  3 Sheets-Sheet 2

INVENTOR.
DALE E. WOLFORD
BY Toulmin & Toulmin
ATTORNEYS

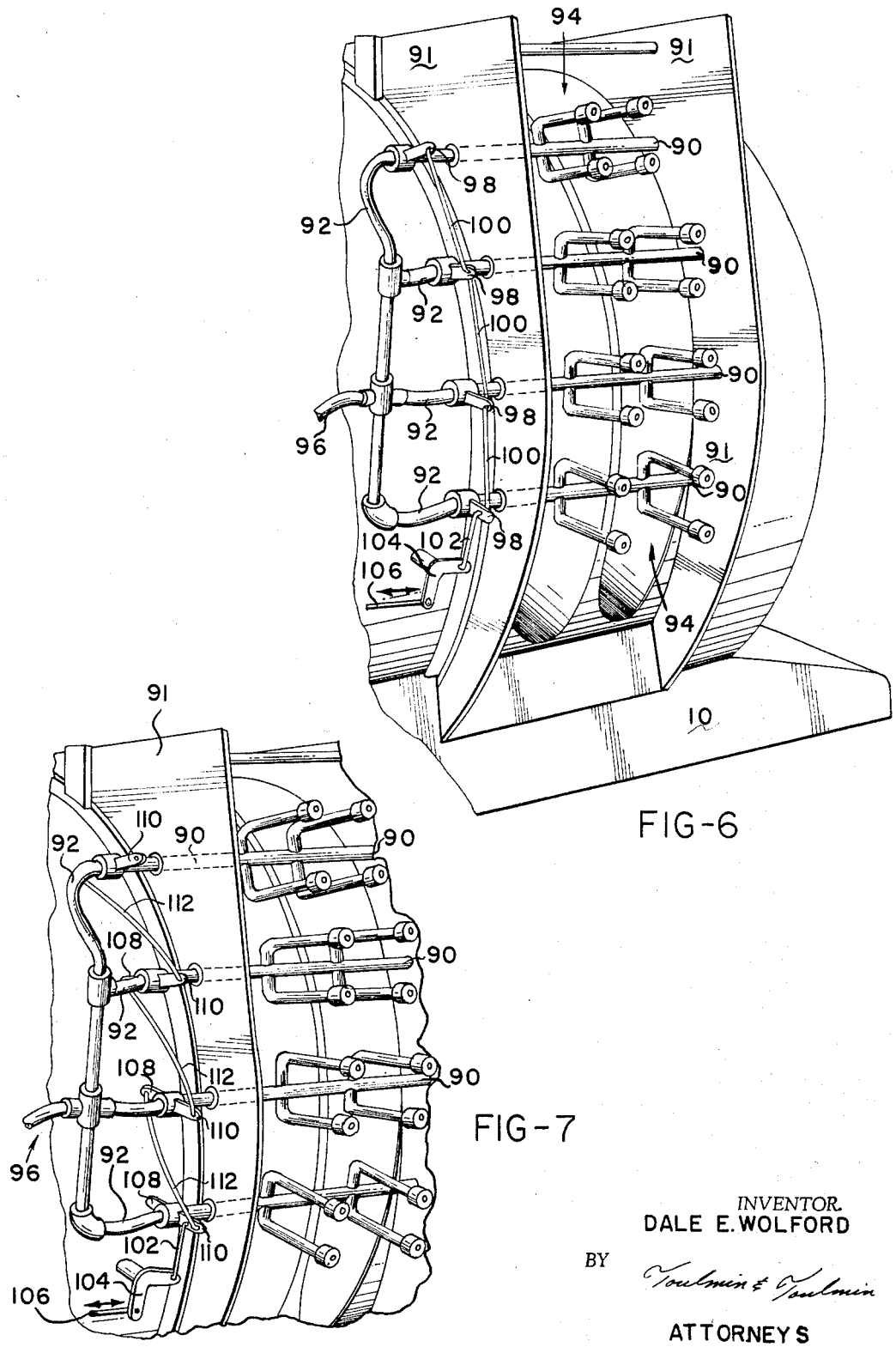

3,278,124
APPARATUS FOR SPRAYING
Dale E. Wolford, Ashland, Ohio, assignor to The F. E. Myers & Bro. Co., Ashland, Ohio, a corporation of Ohio
Filed July 20, 1964, Ser. No. 383,605
11 Claims. (Cl. 239—77)

The present invention relates to spraying, particularly with respect to the spraying of insecticides and fungicides and other liquid chemical treatment materials on or in the region of vegetation, such as trees and the like.

The spraying of liquid materials on vegetation such as trees and the like, of course, is well known and is commonly accomplished by directing an air blast toward the region to be treated and entraining in the air blast the liquid treatment material in the form of droplets that are introduced into the air stream by being sprayed therein from nozzles.

While this arrangement is generally satisfactory for conveying treatment material to plants and for distributing it thereon, it has certain practical limitations that have not heretofore been overcome. In my co-pending application Serial No. 205,752, filed June 27, 1962, now abandoned and entitled "Method of Spraying," there is disclosed an arrangement for improving the effectiveness and efficiency of spraying operation of this nature. In brief, my prior application is concerned with the introduction into the air blast of the liquid treatment material in the form of a fine spray projected into the air blast in the direction of movement thereof and at no less than the same velocity as the air blast and preferably, at a velocity slightly greater than that of the air blast.

The effect of introducing the liquid treatment material in this manner is that a much higher degree of efficiency results because the air stream does not have to pick up and accelerate the treatment material, and it becomes possible to move much more air with a given horsepower and to direct the air stream in a better manner.

The present invention is concerned with a further extension of the inventive thought of the prior application mentioned above and is also a further improvement on my co-pending application Serial No. 250,176, filed January 8, 1963, now abandoned.

The present invention particularly relates to an apparatus for injecting liquid spray material into an air stream with means for varying the direction of the liquid being sprayed into the air stream.

This results in greatly improved efficiency of the spraying device with respect to the direction of the spray material laden air and the uniform distribution of the spray material in the air blast, and makes the spraying device highly effective for certain classes of use. For example, in the spraying of trees in an orchard, the spraying device is moved between rows of the trees and thus will be in the condition of approaching each tree, being beside each tree, and moving beyond each tree. The opportunity is thus presented of delivering spray material to substantially 180° of the periphery of the tree during this movement of the spraying device in a straight line provided the air blast from the spraying device can be directed in the proper manner and provided further that the liquid treatment material is properly entrained in the air blast in a uniformly distributed manner.

This is accomplished in brief by oscillating the nozzles from which the liquid spray emerges. The nozzles are located in a discharge air stream and are oscillated one or more times during the interval that the spraying device passes a given point such as the center of a tree. A spraying device of this nature not only treats substantially half the tree in one pass but also treats it at different angles at which the spray material is delivered to the tree to effect a thorough although not violent agitation of the foliage of the tree and thus provide for a complete treatment thereof including the branches of the tree.

With the foregoing in mind, a primary object of the present invention is the provision of a greatly improved method and apparatus for spraying which results in more efficient operation of the apparatus and more uniform and effective distribution of the spraying material.

Another object of the present invention is the provision of an air blast spraying device in which there is provided an arrangement for oscillating the liquid discharge nozzles which are located in the air blast and which nozzles discharge the liquid in the general direction of the air blast to create a turbulence in the air blast and to uniformly distribute the liquid treatment material in the air blast.

The foregoing objects and advantages as well as other objects and advantages of the present invention will become more apparent upon reference to the following specification, taken in connection with the accompanying drawings, in which:

FIGURE 1 is a side elevational view of a spraying device for the practice of the present invention and including parts somewhat diagrammatically illustrated;

FIGURE 5 is a somewhat diagrammatic perspective view showing the actuating mechanism on one side of the machine for causing swinging movement of the swingable manifold on the particular side of the spraying device;

FIGURE 6 is a perspective view similar to FIGURE 2 showing how the discharge nozzles can be arranged to swing about horizontal axes for oscillating the nozzles of the sprayer in a vertical direction; and FIGURE 7 is a perspective view similar to FIGURE 6 showing another modification in which some discharge nozzles are oscillated in a direction opposite to the rest.

Figure 4:
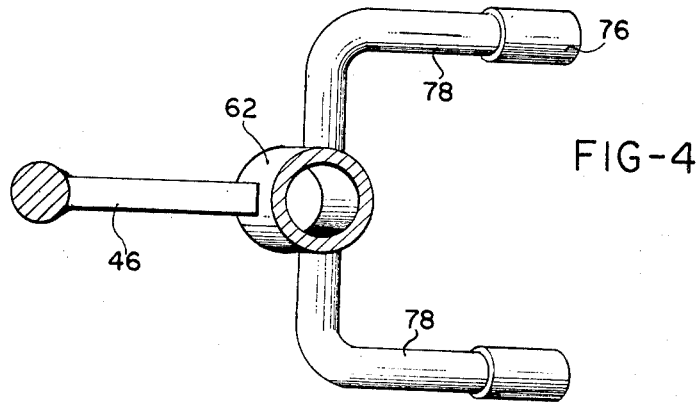
FIGURE 4 is a sectional view indicated by line 4—4 on FIGURE 3 showing the swingable manifold in cross section.

Referring to the drawings somewhat more in detail, FIGURE 1 shows a spraying apparatus in which there is a chassis 10 having supporting wheels 12 so that the spraying device can be drawn over the ground. On chassis 10 is a tank 14 for receiving the liquid material to be sprayed from the device.

To the left end of the spraying device, as is viewed in FIGURE 1, is an engine department 16 in which there is an engine 18 indicated diagrammatically in dot-dash outline. This engine drives a shaft 20 that extends through a tube in tank 14 completely through the tank to the right or rear end of the spraying device where the said shaft is connected with the propeller type air impellers 22. These propellers draw air inwardly through the air inlets 24 and 26 and this air is blown out laterally from the spraying device through the lateral opening 28. This opening may extend completely around the upper portion of the spraying device or it may consist of lateral openings only, or there may be provided deflector blades toward the top of the opening for confining the air blast to a generally lateral and somewhat upwardly inclined region.

The motor 18 is also arranged to drive another shaft 30 extending into the tank the having elements thereon (not shown) for maintaining the liquid treatment material in the tank agitated so that this material is uniform throughout the tank. The shaft 30 at its end opposite motor 18 drives by means of chain 32, the output shaft of a speed reducer 34 that has a crank 36 on its output shaft connected by a rotary joint with an oscillating drag link 38.

Figure 2:
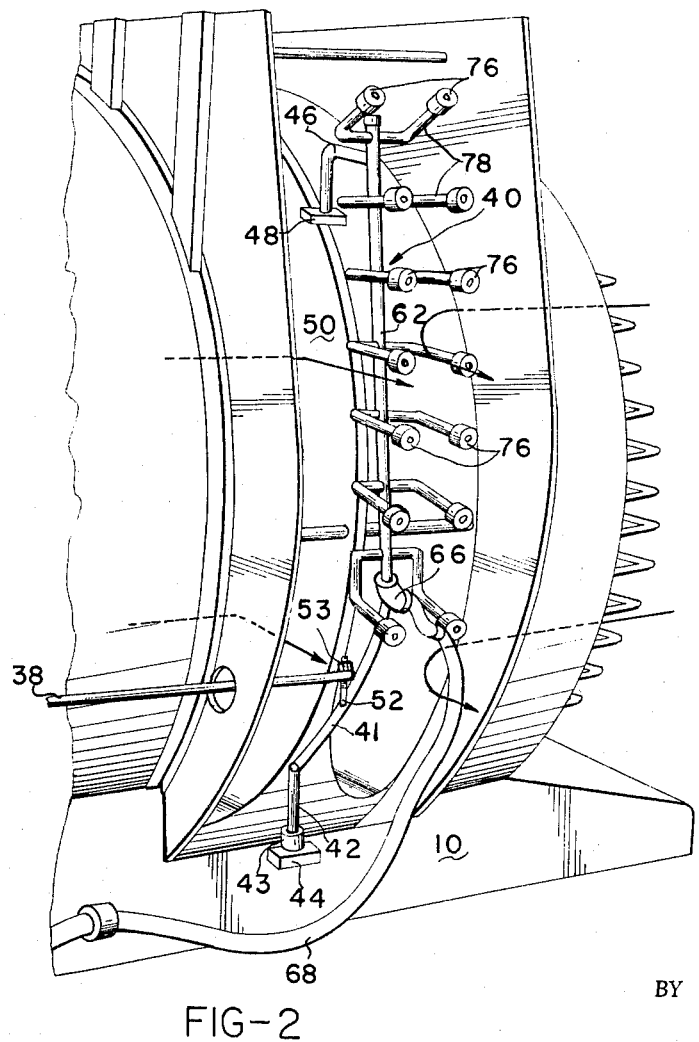
FIGURE 2 is a perspective view of the discharge end of the spraying device showing a swingable nozzle discharge manifold disposed within the discharge opening of the device.
Figure 3:
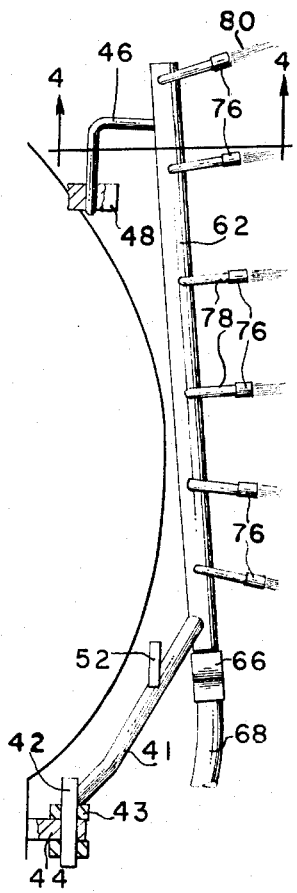
FIGURE 3 is a sectional view indicated by line 3—3 on FIGURE 2 showing the swingable manifold from the side.

A particular feature of the present invention resides in the provision of a swinging manifold means 40 in the discharge opening 28 at each side of the spraying device. This manifold means 40 is best seen in FIGURES 2 and 3 wherein it is seen to comprise a manifold pipe 62 having a support member 41 fixed thereto to the lower end thereof. The support member 41 has the general arcuate shape shown and is fixed at its lower end to pivot shaft 42 which is rotatably received in block 44 which is fixed to chassis 10. The upper end of manifold pipe 62 is fixed to a generally L shaped support member 46 which has the remaining end of member 46 rotatably mounted in pivot block 48 which is fixed to the deflector structure 50 centrally located in the spraying device in the plane of the discharge opening 28. Standard locking collars 43 on pivot shaft 42 is used to adjust and fix the location of manifold means 40 in the support blocks.

There is a generally L shaped link 52 which is threaded at one end and which is secured to support member 41 at the other end. One end of oscillating drag link 38 is pivotally connected to link 52 and secured thereon by a nut 53. It will be appreciated that oscillation of the drag link will cause swinging movement of manifold means 40 about its pivotal supports. The actuating mechanism and the connection thereof between the speed reducer 34 and the manifold means 40 will be seen in FIGURE 5. This figure will also reveal that crank arm 36 has a slot 54 therein in which the end of the drag link 38 can be adjusted thereby to change the angle through which the manifold means 40 will swing.

The speed with which the manifold means 40 oscillates can readily be adjusted by changing the sprockets 56 and 58 which form the driving and driven sprockets respectively that connect the input shaft of speed reducer 34 with the agitator shaft 30. It will be understood that there is generally provided manifold means 40 on each side of the machine, and in order to actuate the means on the opposite side of the machine, the output shaft 59 of the speed reducer 34 could extend out the other side thereof as indicated at 60 in FIGURE 5, thereby providing for a crank 36 on each side of the spraying device.

Another particular feature of the present invention resides in the arrangement for supplying spray material to the air blast that leaves the discharge opening 28 of the spraying device. As will be seen in FIGURES 1, 2, and 3, manifold means 40 has a manifold pipe 62 as shown. This manifold pipe is closed at its upper end, and at its lower end is connected with a fitting such as the elbow 66 to which therein is connected a flexible high pressure supply hose 68 leading to the discharge side of a relatively high pressure pump 70 that is arranged for being driven by engine 18, as indicated diagrammatically at 72. The suction side of pump 70 is connected by conduit 74 with tank 14. The flexible hose will supply the liquid treatment material to manifold 64 but will not interfere with the movement of manifold means 40.

The manifold has connected thereto a plurality of spray nozzle elements 76, each connected to the manifold by an angular conduit 78. The spray material supplied under pressure to manifold 62 thus passes through conduit 78 to nozzles 76 and is atomized therein and is projected into the air blast from each nozzle in the form of the conical spray 80. According to the present invention, the velocity of each spray is at least equal to the velocity of the air blast so that little energy, if any, is taken from the air blast to accelerate the spray material and to carry it along with the air blast. The conical spray 80, however, insures that the spray material will be uniformly distributed in the air blast.

The movement of the nozzles 76 with the manifold means 40 is more effective to fill the air discharged from the machine which is effective in providing a uniform treatment of the liquid spray material on the vegetation being treated.

As will be seen in FIGURE 2, the nozzles 76 are arranged on both sides of the manifold pipe 62 as shown. The manifold means on the opposite side of the spraying device is arranged in the same manner as the one described above.

FIGURE 6 shows a slightly different arrangement in which the manifold means are oscillated on a horizontal axis instead of a vertical axis.

In FIGURE 6 there is a plurality of manifold pipes 90 which are rotatably mounted in side members 91 as shown. Each of the pipes 90 has connected thereto a flexible manifold 92 which is connected to another flexible manifold member 96. Each of the pipes 90 has nozzle assemblies generally indicated at 94 through which the treatment liquid is discharged. The pipes 90 each have an arm 98 thereon which are connected together by links 100 in order to move the arms 98 in unison.

To the lowermost arm is connected the link 102 that is attached to one end of a crank lever 104, the other end of which is connected with drag link 106 that corresponds to drag link 38 of the first described modification.

The vertical oscillation of the nozzles in accordance with the FIGURE 6 arrangement has proved to be highly effective for the agitation of the foliage of the vegetation being treated, and in most cases, the effectiveness of the treatment of vegetation is as good for the FIGURE 6 modification as it is for the FIGURE 2 modification. Both modifications are characterized by the employment of swingable nozzle means so as to more effectively fill the air stream with treatment liquid with the result of more effective coverage of the vegetation being treated.

FIGURE 7 shows another modification which is similar to the controuction of FIGURE 6 except adjacent manifold pipes 30 are made to rotate in opposite directions through a modified form of linkage.

In FIGURE 7 each of the pipes 90 has two arms 108 and 110 connected thereto at 180° apart. One of the arms 108 is connected to arm 110 of the adjacent pipe 90 by a curved link 112 as shown, so that the adjacent pipes 90 will rotate in opposite directions. Flexible manifold pipes 92 can be made long enough to permit flexing and rotation thereof when the pipes 90 are rotated in opposite directions. This modification produces an exceptional amount of turbulence in the air stream which is effective for spraying the foliage.

As has been brought out in my previous application, the weight of liquid spray material may be about $\frac{1}{8}$ of the weight of the air moving through the discharge opening so that a substantial amount of energy is realized by injecting the spray material in accordance with the present invention.

With respect to particular values that might be encountered, the air velocity of 90 m.p.h. is not unusual with spray equipment of the nature disclosed. The liquid material from the nozzles is moved at a velocity preferably 10 to 20% higher than the air velocity. The pressures employed for obtaining good atomization of the liquid, while at the same time deveolping the proper velocity thereon, will run from about 117 pounds per square inch on the liquid to about 200 pounds per square inch. At pressures above 200 pounds per square inch there appears to be little gain in machine performance with air velocities mentioned. This is due to the logarithmic function of nozzle performance, whereby a unit increase in pressure produces a diminishing unit increase in velocity at the nozzle orifice.

Overall optimum machine performance is attained when the liquid material from the nozzles is introduced at a velocity 10% to 20% higher than the air velocity. Pressures higher than those required to produce this liquid velocity and the desired atomization are reflected by large increases in power required with only slight gains in machine performance.

It will be understood that this invention is susceptible to modification in order to adapt it to different usages and conditions and accordingly, it is desired to comprehend such modifications within this invention as may fall within the scope of the appended claims.

What is claimed is:

1. In a spraying device, means for developing an air blast including outlet means in the device through which said air blast passes and which outlet means directs the blast in a predetermined direction, nozzle means for injecting liquid in the air blast in the region of said outlet means, means movably supporting said nozzle means for oscillation in said region of said outlet means, means connected to said nozzle means for supplying liquid treatment material thereto under pressure, and means connected to said nozzle means for oscillating said nozzle means while continuing to discharge said air blast in said predetermined direction to vary the direction of injection of the treatment liquid into the air blast and the region of the air blast into which the said liquid is injected.

2. In a spraying device, blower means for developing an air blast, casing means associated with the blower means including a discharge opening for directing said air blast in a predetermined direction, nozzle means in said opening for discharging treatment liquid into the air blast issuing from said opening, manifold means movably mounted in said discharge opening and having said nozzle means connected thereto, means for delivering treatment liquid under pressure to said manifold means, and means connected to said manifold means for oscillating said manifold means in said discharge opening while continuing to discharge said air blast in said predetermined direction to vary the direction of injection of the treatment liquid into the air blast and the region of the air blast into which the said liquid is injected.

3. In a spraying device, means for developing an air blast, casing means associated with the blower means including a discharge opening from which an air blast from the blower means discharges at high velocity, said discharge opening determining a predetermined direction of said air blast, manifold means movably mounted in said discharge opening, means connected to said manifold means for oscillating said manifold means in said opening, while permitting said air blast to continue in said predetermined direction, means for delivering treatment liquid under pressure to said manifold means, a plurality of nozzle means positioned in said discharge opening and connected to said manifold means and adapted to spray said treatment liquid in said air blast, said oscillation of said manifold means changing the direction of injection of liquid into said air blast and the region of the air blast into which said liquid is injected.

4. In a spraying device; blower means for developing an air blast, casing means associated with the blower means including a discharge opening through which the air blast from the blower means discharges at a high velocity, said discharge opening determining a predetermined direction of said air blast, manifold means movably mounted in said discharge opening, means connected to said manifold means for oscillating said manifold means in said opening, while permitting said air blast to continue in said predetermined direction, means for delivering treatment liquid under pressure to said manifold means, a plurality of spaced nozzle means positioned in said discharge opening carried by said manifold means and adapted to spray said treatment liquid into said air blast in the same general direction as the said air blast is moving while being oscillated with said manifold means, said oscillation of said manifold means changing the direction of injection of liquid into said air blast and the region of the air blast into which said liquid is injected.

5. The device as claimed in claim 4 in which said manifold means is vertically mounted in said discharge opening and the oscillation thereof in said discharge opening is in a generally horizontal direction.

6. The device as claimed in claim 4 in which said manifold means are mounted in a horizontal direction in said discharge opening and the oscillation thereof in said discharge opening is in a generally vertical direction.

7. The device as claimed in claim 4 in which said means for oscillating said manifold means is adjustable for oscillating the manifold means between predetermined limits and at adjustable speeds.

8. The device as claimed in claim 4 in which said manifold means comprises a plurality of spaced parallel manifold pipes which are horizontally mounted in said discharge opening, said means for oscillating said manifold means comprising an arm on each pipe and link means connecting said arm to collectively oscillate said manifold pipes in the same direction.

9. The device as claimed in claim 4 in which said manifold means comprises a plurality of spaced parallel manifold pipes which are horizontally mounted in said discharge opening, said means for oscillating said manifold means comprising an arm on each pipe and link means connecting said arms and adapted to oscillate adjacent manifold pipes in respectively opposite directions.

10. In a spraying device; an axial flow blower having a casing with a lateral discharge opening arranged to discharge a high velocity air blast which is substantially fan shaped in a vertical plane, said opening causing said air blast from the blower to discharge in a predetermined direction fixed relative to the blower casing, a plurality of spaced manifolds extending laterally of said discharge opening and pivotally mounted therein and oscillatable on their respective pivotal supports, a plurality of spaced nozzles positioned in said discharge opening and connected with each said manifold and adapted to inject treatment liquid in said air blast in the general direction of movement of said air blast, each nozzle being supported by its respective manifold in spaced relation to the manifold so that the nozzles will oscillate in said discharge opening along curved paths upon oscillatory movement of the manifold, flexible conduit means connected to each said manifold and leading to a common supply manifold member, means for delivering treatment liquid under pressure to said common supply manifold member and therefrom to said manifolds and the nozzles carried thereby, each said manifold having arm means rigidly connected to one end thereof and extending angularly to the respective manifold, links pivotally joining the said arm means of adjacent manifolds together so as to cause said manifolds to oscillate in unison in said discharge opening thereby to cause said nozzles also to oscillate in unison in said discharge opening while said air blasts continues in one and the same said predetermined direction, said oscillation of said nozzles varying the direction of injection of treatment liquid into said air blast and the region of the air blast into which said treatment liquid is injected, and means connected to one of said arms for oscillating said manifold together with the nozzles supported thereon in said opening.

11. A spraying device according to claim 10 in which the points of pivotal connection of said links with the said arm means of each manifold is on the opposite side of the respective manifold from the point of connection of the links with the arm means of the next adjacent manifold so that adjacent manifolds will oscillate in unison but in respectively opposite directions.

References Cited by the Examiner
UNITED STATES PATENTS

| | | | |
|---|---|---|---|
| 2,583,753 | 1/1952 | Spreng et al. | 239—77 |
| 2,587,240 | 2/1952 | Spreng | 239—77 |
| 2,599,465 | 6/1952 | Letvin et al. | 239—8 |
| 3,097,794 | 7/1963 | Dawson | 239—78 |
| 3,141,615 | 7/1964 | Woldron | 239—8 |
| 3,151,812 | 10/1964 | Culp | 239—78 |

EVERETT W. KIRBY, *Primary Examiner.*